(12) United States Patent
Loras et al.

(10) Patent No.: US 7,995,653 B2
(45) Date of Patent: Aug. 9, 2011

(54) METHOD FOR FINDING THE PREDICTION DIRECTION IN INTRAFRAME VIDEO CODING

(75) Inventors: Frédéric Loras, Versailles (FR); Jean-Christophe Amiel, Arcueil (FR)

(73) Assignee: France Telecom, Paris (FR)

( * ) Notice: Subject to any disclaimer, the term of this patent is extended or adjusted under 35 U.S.C. 154(b) by 1178 days.

(21) Appl. No.: 10/589,326

(22) PCT Filed: Jan. 31, 2005

(86) PCT No.: PCT/FR2005/000195
§ 371 (c)(1),
(2), (4) Date: Feb. 16, 2007

(87) PCT Pub. No.: WO2005/088979
PCT Pub. Date: Sep. 22, 2005

(65) Prior Publication Data
US 2007/0147501 A1    Jun. 28, 2007

(30) Foreign Application Priority Data

Feb. 13, 2004 (EP) .................................... 04300081

(51) Int. Cl.
H04N 11/02 (2006.01)
(52) U.S. Cl. .............................. 375/240.12; 375/240.24
(58) Field of Classification Search .................. None
See application file for complete search history.

(56) References Cited

U.S. PATENT DOCUMENTS

| | | | | |
|---|---|---|---|---|
| 6,765,964 B1 * | 7/2004 | Conklin | .................... | 375/240.14 |
| 7,116,830 B2 * | 10/2006 | Srinivasan | .................... | 382/236 |
| 7,289,562 B2 * | 10/2007 | Yan et al. | .................. | 375/240.03 |
| 7,289,674 B2 * | 10/2007 | Karczewicz | .................. | 382/238 |
| 7,386,048 B2 * | 6/2008 | Sun et al. | .................. | 375/240.15 |

(Continued)

OTHER PUBLICATIONS

J. Zhang et al., "A fast intra prediction method for H.264 video coding", Proceedings of SPIE—The International Society for Optical Engineering; Applications of Digital Image Processing XXVI 2003, vol. 5203, pp. 753-761, 2003.

(Continued)

*Primary Examiner* — Christopher Kelley
*Assistant Examiner* — Christopher Findley
(74) *Attorney, Agent, or Firm* — Cohen Pontani Lieberman & Pavane LLP

(57) ABSTRACT

A method of finding the prediction direction during intraframe video image coding. The method comprises the following steps: selecting two initial prediction directions (E, S), calculating virtual blocks associated with said initial prediction directions (E, S), comparing said virtual blocks with the current block and selecting the initial prediction direction (E), which is then called the first main direction, calculating virtual blocks associated with the prediction directions (ENE, ESE) immediately adjacent to said first main direction (E), comparing said virtual blocks with the current block to determine the best prediction direction, if the best prediction direction is the first main direction (E) or one direction (ENE) of the immediately adjacent directions situated at one extremity of the set of prediction directions, deciding this best direction is the required prediction direction, otherwise, calculating the virtual block associated with the prediction direction (SE) other than the first main direction (E) that is immediately adjacent to the second main direction (ESE), comparing said virtual blocks with the current block to determine the best prediction direction, if said best prediction direction is said second main direction (ESE) or the immediately adjacent direction (SE) situated at one extremity of the set of prediction directions, deciding that best direction is the required prediction direction, otherwise, continuing the process iteratively until the required prediction direction is found. Application to video coding.

8 Claims, 2 Drawing Sheets

U.S. PATENT DOCUMENTS

2003/0206594 A1* 11/2003 Zhou .................. 375/240.16
2006/0072676 A1* 4/2006 Gomila .................. 375/240.27

OTHER PUBLICATIONS

M. Bojun et al., "Efficient intra-prediction algorithm in H.264", Proceedings of the IEEE International Conference on Image Processing—ICIP, Barcelona, Spain, vol. 3, pp. 837-840, Sep. 14, 2003.

K. Changsung et al., "Multistage mode decision for intra prediction in H.264 codec", Proceedings of the SPIE—The International Society for Optical Engineering, San Jose, USA, vol. 5308, No. 1, pp. 355-363, Jan. 20, 2004.

T. Wiegand et al., "Overview of the H.264/AVC Video Coding Standard", IEEE Transactions on Circuits and Systems for Video Technology, IEEE Inc., New York, USA, vol. 13, No. 7, pp. 560-576, Jul. 2003.

"Text of Committee Draft of Joint Video Specification (ITU-T Rec. H.264/ISO/IEC 14496-10 AVC)" International Organization for Standardization—Organisation Internationale De Normalisation, pp. 1-25, Jul. 2002.

* cited by examiner

METHOD FOR FINDING THE PREDICTION DIRECTION IN INTRAFRAME VIDEO CODING

RELATED APPLICATION

This is a U.S. national stage of application No. PCT/FR2005/000195, filed on 31 Jan. 2005.

FIELD OF THE INVENTION

The present invention relates to a method of finding the prediction direction in intraframe video coding.

One particularly advantageous application of the invention is to intraframe video coding as defined in the H.264/MPEG-4 AVC standard.

BACKGROUND OF THE INVENTION

Video coding an image generally consists in effecting on that image operations known as compression, with the aim of facilitating the transmission of the image over telecommunications networks by reducing the quantity of data to be transmitted, at the same time as attempting to obtain a final reproduced image of the best possible quality.

Interframe image coding essentially consists in establishing the difference between a current image and an image predicted from preceding images. Only the difference is transmitted, which represents a high level of compression since the quantity of data to be transmitted is considerably reduced.

In intraframe coding the video image is coded with respect to itself, with no reference and no comparison with other images, in particular with preceding images.

In a video call, intraframe coding is necessary for initialization and synchronization and has the particular feature of limiting the dependency of an image block to adjacent blocks only. This form of coding has the advantage of being robust. However, it has the disadvantage that image compression is not so good.

In recent coding standards, such as the ITU-T standard H.264 (ISO/IEC/JTC1 standard MPEG-4 AVC), intraframe block coding relies on prediction relative to adjacent picture elements (pixels). The prediction of a block leads to the construction of a virtual block for the current block, comparing the virtual block with the current block determines the difference between the virtual block and the current block, and the difference is transmitted over the network accompanied by additional data enabling the block to be reconstituted from this difference. Appropriate processing by the receiver reconstitutes the video image by applying the difference transmitted to the virtual block reconstructed by means of this additional data. Intraframe coding therefore has the same advantage of better compression as interframe coding.

To improve intraframe coding, prediction directions are defined that are used to interpolate the pixels of an adjacent block to predict the current block, i.e. to construct a virtual block associated with each prediction direction, and the virtual block that compares best with the current block determines the difference to be transmitted over the network. In other words, each prediction direction is associated with a different processing algorithm yielding a different virtual block. There are therefore as many virtual blocks for the same current block as there are prediction directions. Of course, the prediction direction chosen is that which minimizes the quantity of data to be transmitted at the same time as keeping the best possible quality, in other words, the direction that achieves the best quality/compression trade-off.

A conventional method of enabling the coder to decide on the best prediction direction systematically calculates all the virtual blocks for all possible prediction directions and then compares all these virtual blocks with the current block to determine the direction that gives the smallest difference between the associated virtual block and the current block.

However, because of its complexity, entailing calculating all the necessary interpolations for calculating all the virtual blocks, this method proves very costly in terms of computation time.

SUMMARY OF THE INVENTION

Accordingly, one object of the present invention is to provide, in an intraframe video coding process that calculates virtual blocks associated with a current image block in given prediction directions, a method of finding the prediction direction of the current image block that reduces the calculation time needed to find the best prediction direction, i.e. the prediction direction that yields the virtual block closest to the current block.

One aspect of the present invention is directed to a method comprising the following steps:

selecting two initial prediction directions from the given prediction directions, calculating virtual blocks associated with said initial prediction directions, comparing said virtual blocks with the current block and selecting the initial prediction direction that minimizes the difference between the associated virtual block and the current block, which prediction direction is then called the first main direction, calculating virtual blocks associated with the prediction directions immediately adjacent to said first main direction, comparing the virtual blocks associated with the first main direction and said immediately adjacent directions with the current block to determine the best prediction direction, which is the prediction direction that minimizes the difference between the associated virtual block and the current block, if said best prediction direction is said first main direction or one of the immediately adjacent directions if it is situated at one extremity of the set of prediction directions, deciding this best direction is the required prediction direction, otherwise, selecting the prediction direction that minimizes the difference between the associated virtual block and the current block, which is then called the second main direction, calculating the virtual block associated with the prediction direction other than the first main direction that is immediately adjacent to the second main direction, comparing the virtual blocks associated with the second main prediction direction and with said immediately adjacent direction with the current block to determine the best prediction direction, which is the prediction direction that minimizes the difference between the associated virtual block and the current block, if said best prediction direction is said second main direction or the immediately adjacent direction if it is situated at one extremity of the set of prediction directions, deciding that best direction is the required prediction direction, otherwise, continuing the process iteratively until the required prediction direction is found.

Accordingly, as emerges in more detail below, by minimizing the number of directions tested by an iterative method, the invention finds the best prediction direction without it being necessary to calculate all the virtual blocks associated with all the prediction directions, which obviously leads to a reduction in the corresponding calculation time.

In one particular implementation of the invention, said iteration is stopped if the best current prediction direction is adjacent to a direction immediately adjacent to the initial direction not retained as the first main direction. This has the advantage of further limiting the number of prediction directions tested and thus of helping to reduce the calculation time required.

Finally, an embodiment of the invention also provides for said initial prediction directions to be vertical and horizontal directions as defined in the H.264/MPEG-4 AVC standard. These directions are those whose interpolations relative to the other diagonal directions are the simplest to calculate.

DETAILED DESCRIPTION OF THE DRAWINGS

Figure 1:
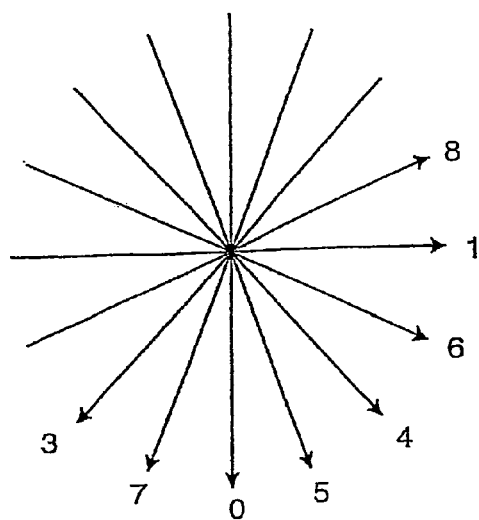
FIG. 1 is a diagram of the prediction directions adopted for intraframe coding in the H.264/MPEG-4 AVC standard.

FIG. 1 represents the eight prediction directions of the H.264/MPEG-4 AVC standard for calculating eight virtual blocks of a current block, including the virtual block having the least difference with respect to the current block that will determine the best prediction direction, i.e. the direction that will be used for intraframe coding of the image.

The best prediction direction comparison calculation may be effected in various ways, for example by calculating the sum of the absolute value differences between the pixels being coded and the corresponding prediction. The sums obtained can then be compared and only the smallest sum retained.

Figure 3:
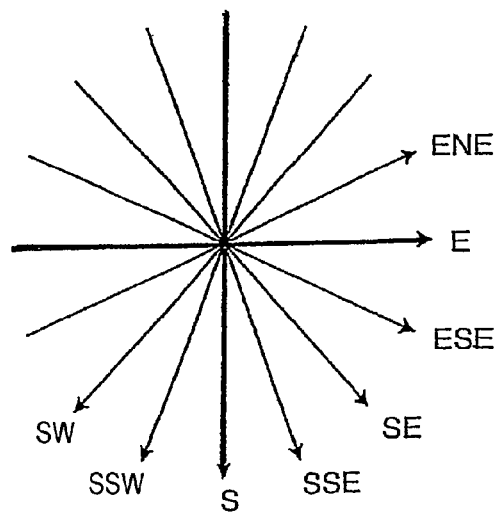
FIG. 3 is the same diagram as FIGS. 1 and 2 showing the terminology used to designate the prediction directions.

FIG. 3 shows the correspondence between the FIG. 1 prediction directions and the names of those directions used below.

The first step of the method of the invention firstly selects from the eight prediction directions two starting prediction directions, called the initial directions.

Figure 2:
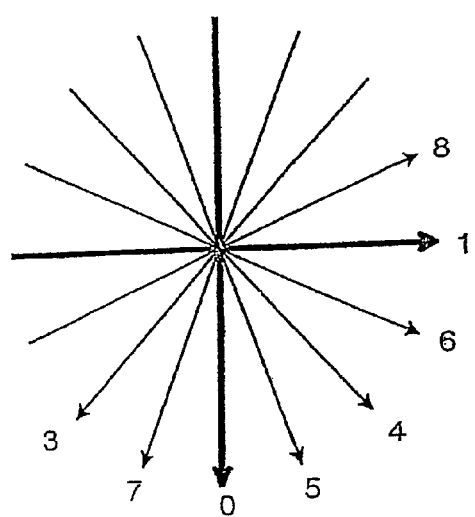
FIG. 2 is the same diagram as FIG. 1 indicating the initial prediction directions used by a method in accordance with the invention.

As indicated in FIG. 2, it is advantageous to choose the horizontal and vertical prediction directions, i.e. the directions "0" and "1" in FIG. 1 and the directions S and E in FIG. 3. The interpolations for these two particular directions relative to the other directions are very simple to calculate, requiring only one pixel to be looked up in the memory of the system, the value of which pixel is simply copied into the virtual block. For the other prediction directions, the complexity is much greater and depends on the diagonal. The H.264/MPEG-4 AVC standard discusses the evaluation of this complexity as a function of the prediction direction.

Figure 4:
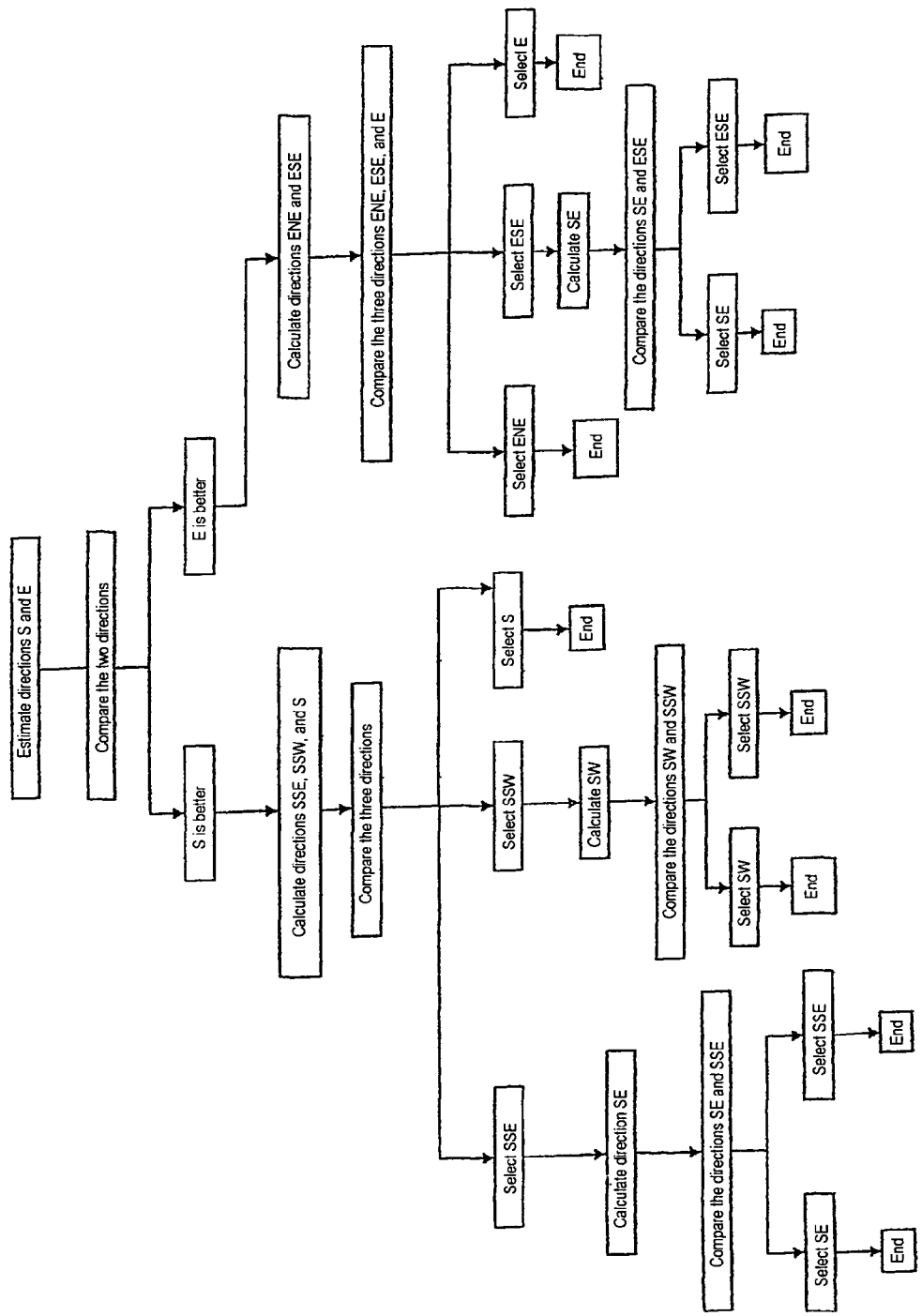
FIG. 4 is a flowchart of a method in accordance with the invention.

As can be seen in the FIG. 4 flowchart, the virtual blocks calculated in the two initial directions S and E are compared to the current block to determine the better of those two directions in terms of the difference between the associated virtual block and the current block. It is assumed here that the initial prediction direction E is the better direction and therefore the direction retained for the remainder of the process. It is then referred to as the "first main direction".

The two prediction directions immediately adjacent to the first main direction E are then considered, namely the directions ENE and ESE, and the associated virtual blocks are calculated.

The virtual blocks associated with the prediction directions E, ENE and ESE are compared to the current block to determine which of the three directions gives the smallest difference compared to the current block.

If the first main direction E is the best direction, then that direction is considered to be the prediction direction required for intraframe coding of the block. The required direction having been found, the process terminates.

The same applies if the direction ENE is the best direction. This direction being situated at one extremity of the set of eight possible prediction directions, the iteration cannot continue. The process is stopped, and this direction ENE is taken as the required prediction direction.

Otherwise the best prediction direction is the direction ESE, which is called the "second main direction".

The process continues by considering the prediction direction immediately adjacent to the second main direction ESE that is not the first main direction E. In the present example, this is the prediction direction SE. The virtual block associated with the prediction direction SE is calculated and compared to the current block.

Two situations can arise: either the second main direction ESE is the better direction and therefore constitutes the best prediction direction, in which case the process terminates, or else the direction SE is the better direction. From SE, iteration toward the direction SSE can continue in the same way, by comparing the directions SE and SSE. However, the iteration could equally well be stopped, as shown in FIG. 4, by considering the direction SE to be the best if it is assumed that the direction SSE close to the initial direction S that was not retained cannot be better than the direction SE. This saves even more calculation time by avoiding an operation that has every chance of proving to be of no utility.

The method described above is executed by a coding device comprising means adapted to execute the steps explained above. The coding device is preferably an electronic data processing device incorporating a software module containing software instructions for commanding execution of the steps of the method by the coding device. Consequently, the invention also relates to a software module for a coding device comprising software instructions for having the coding device execute the above method and a coding device comprising that software module. The software module can be stored in or transmitted by a data medium. That medium may be a hardware storage medium, for example a CD-ROM, a magnetic disc or a hard disc, or a transmissible medium, such as an electrical, optical, or radio signal.

The invention claimed is:
1. A method of finding the prediction direction of a current image block during intraframe image coding, the method calculating virtual blocks associated with said current block in given prediction directions, which method comprises the following steps:
   selecting two initial prediction directions (E, S) from the given prediction directions,
   calculating virtual blocks associated with said initial prediction directions (E, S), comparing said virtual blocks with the current block and selecting the initial prediction direction (E) that minimizes the difference between the associated virtual block and the current block, which prediction direction is then called the first main direction, calculating virtual blocks associated with the prediction directions (ENE, ESE) immediately adjacent to said first main direction (E), comparing the virtual blocks associated with the first main direction (E) and said immediately adjacent directions (ENE, ESE) with the current block to determine the best prediction direction, which is the prediction direction that minimizes the difference between the associated virtual block and the current block, if said best prediction direction is said first main direction (E) or one direction (ENE) of the immediately adjacent directions if it is situated at one extremity of the set of prediction directions, determining that said best direction is the prediction direction of the current image block, otherwise, selecting the prediction direction (ESE) that minimizes the difference between the associated virtual block and the current block, which is then called the second main direction, calculating the virtual block associated with the prediction direction (SE) other than the first main direction (E) that is immediately adjacent to the second main direction (ESE), comparing the virtual blocks associated with the second main prediction direction (ESE) and with said immediately adjacent direction (SE) with the current block to determine the best prediction direction, which is the prediction direction that minimizes the difference between the associated virtual block and the current block, if said best prediction direction is said second main direction (ESE) or the immediately adjacent direction (SE) if it is situated at one extremity of the set of prediction directions, determining that said best direction is the prediction direction of the current image block, otherwise, continuing the process iteratively until the prediction direction of the current image block is determined.

2. The method according to claim 1, wherein said iteration is stopped if the best current prediction direction (SE) is adjacent to a direction (SSE) immediately adjacent to the initial direction (S) not retained as the first main direction.

3. The method according to claim 2, wherein said initial prediction directions are vertical and horizontal directions as defined in the H.264/MPEG-4 AVC standard.

4. A software module, stored on a non-transitory medium, for a coding device containing software instructions for commanding the execution by the coding device of the steps of the method according to claim 3.

5. A software module, stored on a non-transitory medium, for a coding device containing software instructions for commanding the execution by the coding device of the steps of the method according to claim 1.

6. The method according to claim 1, wherein said initial prediction directions are vertical and horizontal directions as defined in the H.264/MPEG-4 AVC standard.

7. A software module, stored on a non-transitory medium, for a coding device containing software instructions for commanding the execution by the coding device of the steps of the method according to claim 2.

8. A coding device comprising the software module according to claim 5.

* * * * *